United States Patent
Bao

(10) Patent No.: US 7,257,829 B2
(45) Date of Patent: Aug. 14, 2007

(54) OPTICAL REPRODUCING/RECORDING APPARATUS

(75) Inventor: Wen-Jie Bao, Shenzhen (CN)

(73) Assignees: Hong Fu Jin Precision Ind. (Shenzhen) Co., Ltd., Shenzhen (CN); Hon Hai Precision Ind. Co., Ltd., Tu-Cheng (TW)

( * ) Notice: Subject to any disclaimer, the term of this patent is extended or adjusted under 35 U.S.C. 154(b) by 506 days.

(21) Appl. No.: 10/853,418

(22) Filed: May 24, 2004

(65) Prior Publication Data

US 2004/0246830 A1   Dec. 9, 2004

(30) Foreign Application Priority Data

May 24, 2003   (CN) .............................. 03 2 26517

(51) Int. Cl.
   G11B 7/09   (2006.01)
(52) U.S. Cl. ..................................... 720/678
(58) Field of Classification Search ................ 720/674, 720/675
   See application file for complete search history.

(56) References Cited

U.S. PATENT DOCUMENTS

| 5,768,248 | A | * | 6/1998 | Lee .............................. 720/675 |
| 5,889,755 | A | * | 3/1999 | Kim ............................. 720/675 |
| 5,933,408 | A |   | 8/1999 | Park et al. |
| 5,995,478 | A | * | 11/1999 | Park ............................. 720/675 |
| 6,351,444 | B1 | * | 2/2002 | Sogawa et al. ............. 720/676 |
| 6,795,971 | B2 |   | 9/2004 | Lin |
| 2005/0097585 | A1 | * | 5/2005 | Pan ............................. 720/675 |

FOREIGN PATENT DOCUMENTS

| JP | 09213025 | A | * | 8/1997 |
| JP | 11203801 | A | * | 7/1999 |
| JP | 2002015434 | A | * | 1/2002 |
| JP | 2002230922 | A | * | 8/2002 |
| JP | 2003091945 | A | * | 3/2003 |
| TW | 86219334 |   |   | 11/1997 |
| WO | WO 2061748 | A1 | * | 8/2002 |

* cited by examiner

Primary Examiner—William J Klimowicz
(74) Attorney, Agent, or Firm—Wei Te Chung

(57) ABSTRACT

An optical reproducing/recording apparatus (1) includes a chassis (11) with a first seat (17) and three second seats (16), a turntable (12), an optical pickup head (13) and a guide device (15). The turntable is located on the chassis for rotating an optical disk positioned thereon. The guide device has a first and second beams (151, 152). An end of the first beam is fixed on the first seat, the other end of the first beam and two ends of the second beam are respectively fixed on the second seats by an adjustable device (18). Each second seat has a groove for accommodating the beam and each adjustable device comprises an elastic element (182) and an adjustable element (181). The elastic element is positioned between the beam and a bottom of the groove and the adjustable element fixes the beam in the groove against a side of said groove.

18 Claims, 4 Drawing Sheets

OPTICAL REPRODUCING/RECORDING APPARATUS

BACKGROUND OF THE INVENTION

1. Field of the Invention

The present invention generally relates to optical reproducing/recording apparatuses, and more particularly to an optical reproducing/recording apparatus having an adjustable device for fixing a guide device of an optical pickup head.

2. Description of Prior Art

A conventional optical reproducing/recording apparatus has an optical pickup head for reproducing signals from an optical disk or recording signals on an optical disk. The optical pickup head must be moveable relative to an optical disk in such a relation that a laser from the optical pickup head is always perpendicularly incident on the optical disk. If the optical pickup head slides along rails to move relative to the optical disk, positions of the ends of the rails must be finely adjustable to assure that the laser is always perpendicular to the disk.

TW Patent No. 86219334 discloses an optical reproducing/recording apparatus comprising an adjustable device for an optical pickup head guide device. The optical reproducing/recording apparatus has an optical pickup head guide device with two guide rails for directing the movement of the optical pickup head. The optical reproducing/recording apparatus has a first seat and three second seats, each seat having a groove defined therein. Ends of the two guide rails are respectively installed in the corresponding groove of the first or second seats. Three ends of the two guide rails are respectively fixed in the groove of the second seats by an adjustable device. The adjustable device comprises a spring and a screw. The spring is located between the guide rail and a bottom of the groove, and the screw fixes the guide rail at an end of the groove.

However, the optical reproducing/recording apparatus has a shortcoming. The screw fixes the guide rail at an end of the groove, but no force is directed sideways is between the groove and guide rail, thus the guide rail can easily deviate in a horizontal direction.

An optical reproducing/recording apparatus wherein a horizontal position of an optical pickup head guide device is precisely positioned is desired.

SUMMARY OF THE INVENTION

Accordingly, an object of the present invention is to provide an optical reproducing/recording apparatus which precisely positions the horizontal positions of an optical pickup head guide device.

To achieve the above object, an optical reproducing/recording apparatus in accordance with the present invention comprises a chassis with a first seat and three second seats, a turntable, an optical pickup head, and a guide device. The turntable is located on the chassis for rotating an optical disc positioned thereon. The guide device has a first and second beams. An end of the first beam is fixed on the first seat, the other end of the first beam and two ends of the second beam are respectively fixed on the second seats by an adjustable device. Each second seat has a groove for accommodating the beam and each adjustable device comprises an elastic element and an adjustable element. The elastic element is positioned between the beam and a bottom of the groove and the adjustable element fixes the beam in the groove at a side of said groove.

BRIEF DESCRIPTION OF THE DRAWINGS

Other objects, advantages and novel features of the present invention will be drawn from the following detailed description of a preferred embodiment of the present invention with attached drawings, in which.

DETAILED DESCRIPTION OF PREFERRED EMBODIMENT

Figure 1:
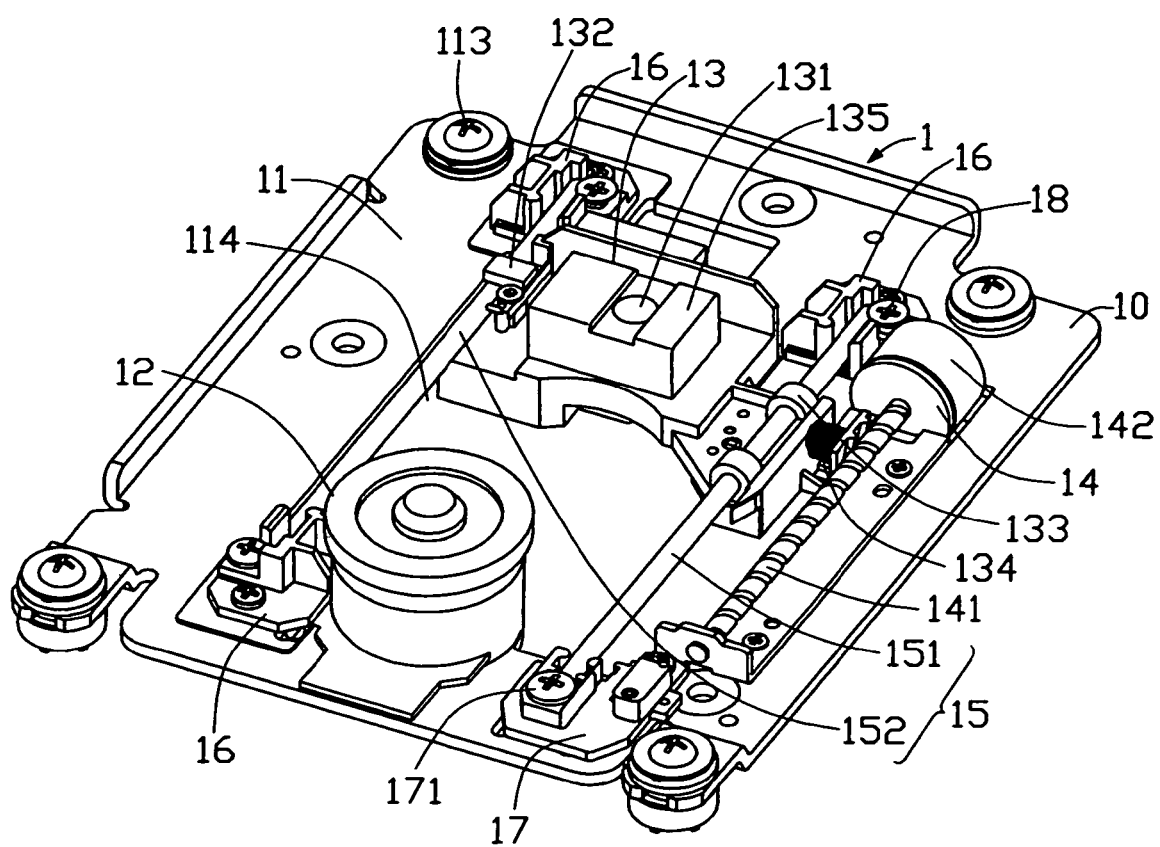
FIG. 1 is a perspective view of a core of an optical reproducing/recording apparatus in accordance with the present invention.
Figure 2:
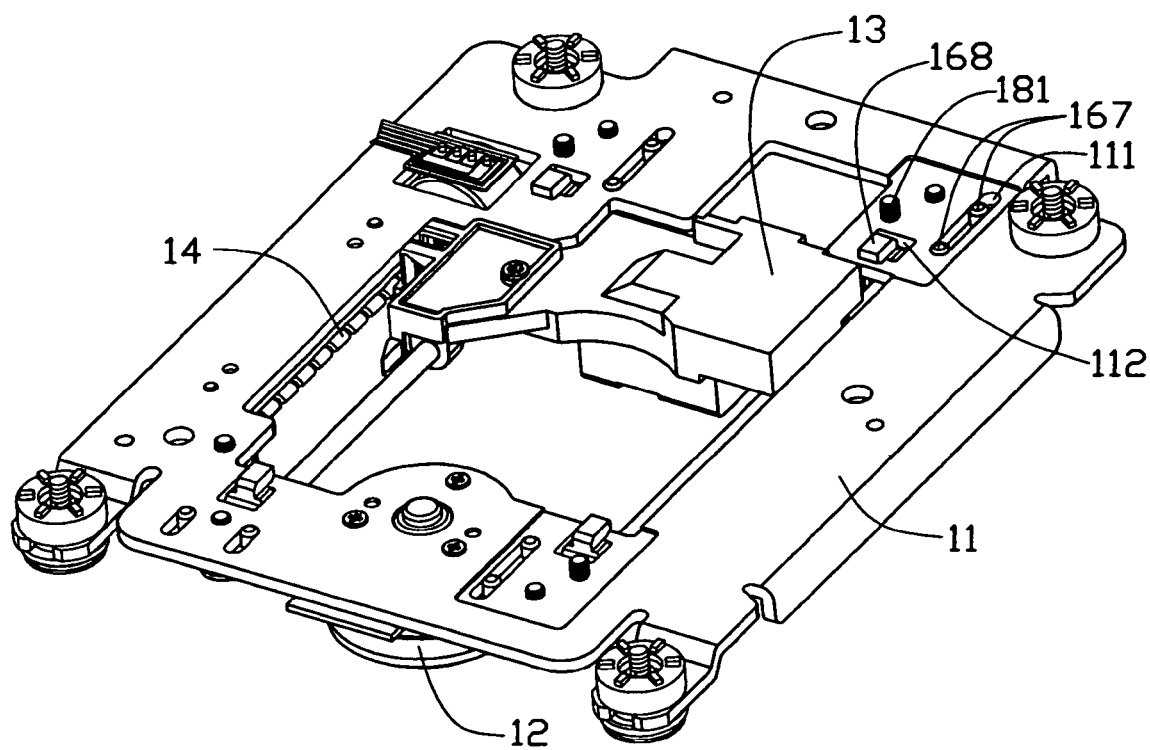
FIG. 2 is a perspective view of the core shown in FIG. 1, from a reverse aspect.

Referring to FIGS. 1 and 2, an optical reproducing/recording apparatus 1 in accordance with the present invention comprises an enclosure (not shown) and a core 10 which is enclosed in the enclosure. The core 10 is fixed in the enclosure by screws 113.

The core 10 has a chassis 11, a turntable 12, an optical subassembly 13, an optical subassembly driver 14 and a guide device 15. The turntable 12 is fixed on the chassis 11 for rotating an optical disk (not shown) located thereon. The optical subassembly 13 reproduces signals from the optical disk or records signals on the optical disk. The optical subassembly driver 14 drives the optical subassembly 13 to move in a direction radial to the optical disk. The guide device 15 directs the movement of the optical subassembly 13 and assures that light from the optical subassembly 13 is perpendicularly incident on the optical disk.

The chassis 11 has an opening 114 for accommodating the optical subassembly 13 and providing a space for the movement of the optical subassembly 13. A first seat 17 and three second seats 16 are fixed around the opening 114 for fixing the guide device 15.

The optical subassembly 13 has an optical pickup head 131 and an optical pickup head base 135. The optical pickup head 131 is fixed on the optical pickup head base 135. The optical pickup head base 135 has two lantern rings 133, a first contact 132 and a second contact 134.

The optical subassembly driver 14 has a motor 142 and a screw pole 141 connected with the motor 142. The second contact 134 of the optical subassembly 13 engages with the screw pole 141 of the optical subassembly driver 14. The motor 142 drives the screw pole 141 to rotate and the rotation of the screw pole 141 makes the optical subassembly 13 move in a direction radial to the optical disk.

Figure 3:
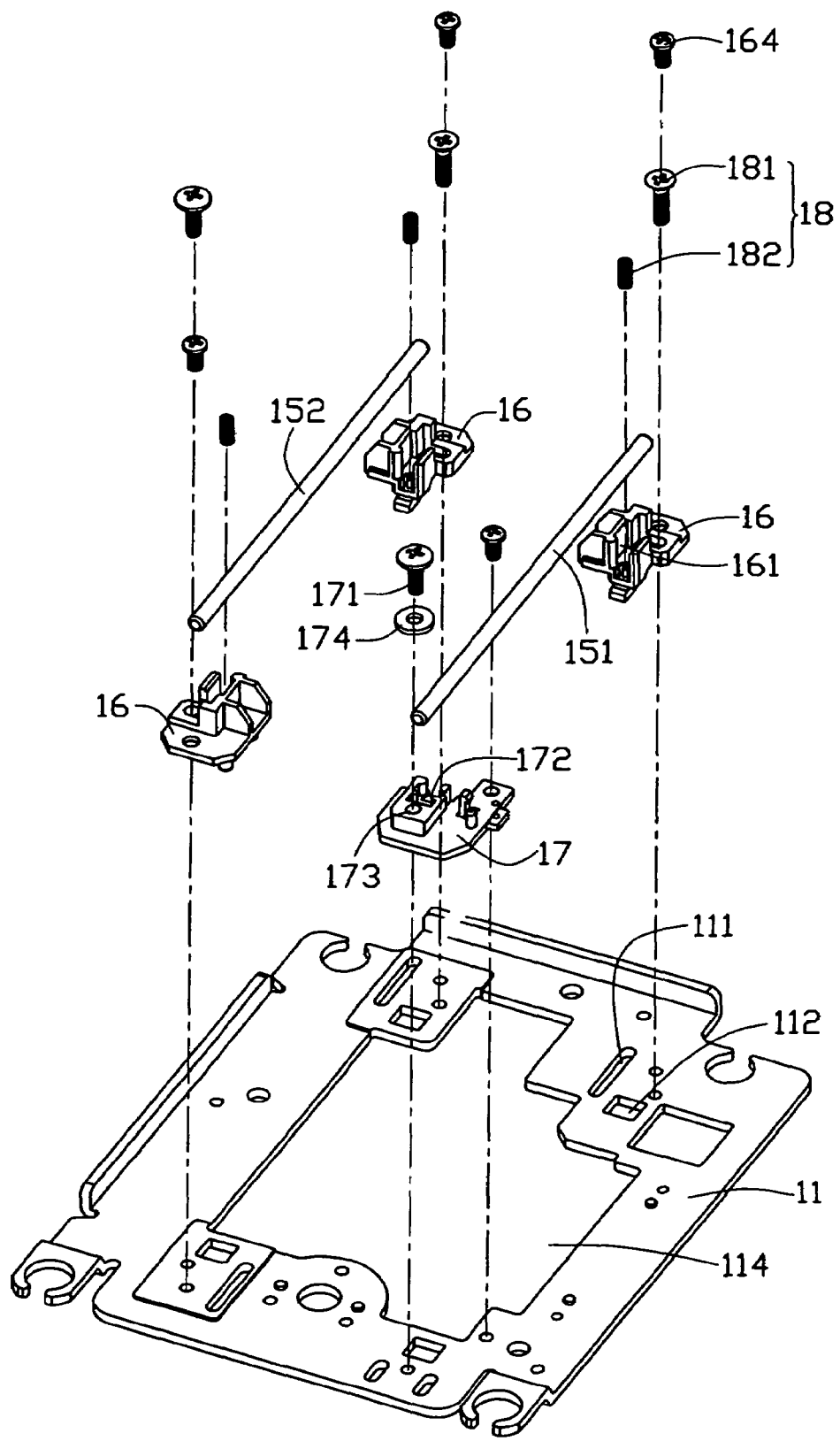
FIG. 3 is a partial exploded view of the core shown in FIG. 1.

Also referring FIG. 3, the guide device 15 has a first beam 151 and a second beam 152. The first and second beams 151, 152 respectively engage with the lantern rings 133 and the first contact 132 of the optical subassembly 13. The first and second seats 17, 16 respectively have a groove 172, 161 defined therein for respectively accommodating an end of the first or second beams 151, 152. A screw hole 173 is defined at an end of the groove 172 of the first seat 17. An end of the first beam 151 is accommodated in the groove 172 of the first seat 17. A fixture screw 171 engages with the screw hole 173 to fix the first beam on the first seat 17. A gasket 174 is engaged between the fixture screw 171 and the first seat 17. The other end of the first beam 151 and two ends of the second beam 152 are respectively installed on the second seats 16 by an adjustable device 18. The relationship of the beams 151, 152 is finely adjusted by the adjustable devices 18. Each adjustable device 18 has an adjustable screw 181 and a spring 182. The spring 182 is located between the beam and a bottom of the groove 161 of the second seat 16. Each adjustable screw 181 has a conical-shaped surface (not labeled) to fix the beam in the groove 161 of the second seat 16.

Figure 4:
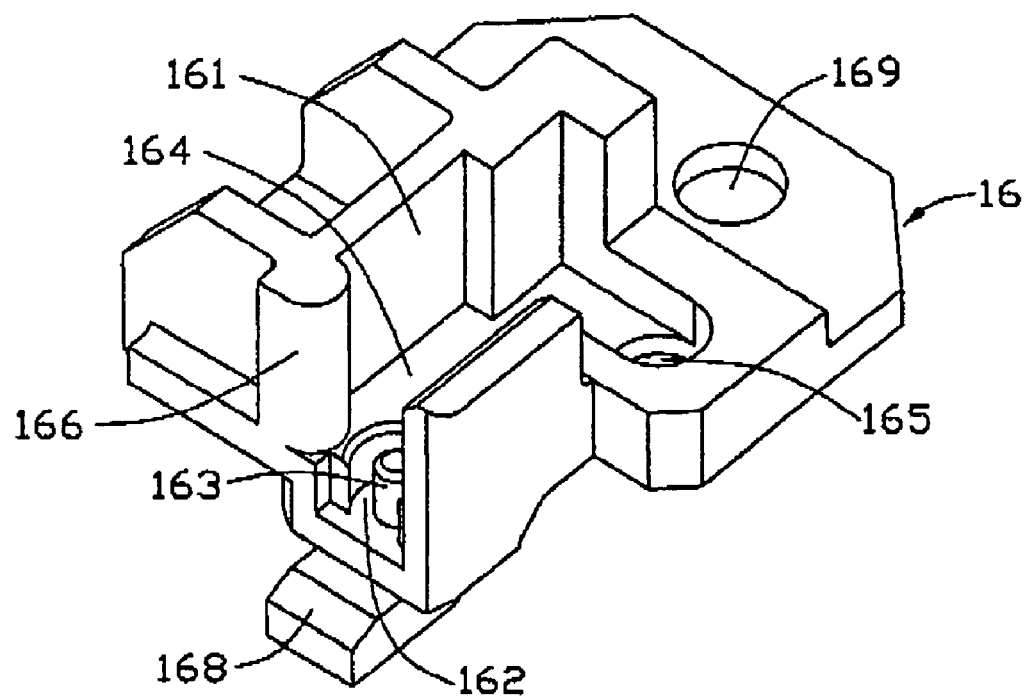
FIG. 4 is a perspective view of a second seat of the core shown in FIG. 1.
Figure 5:
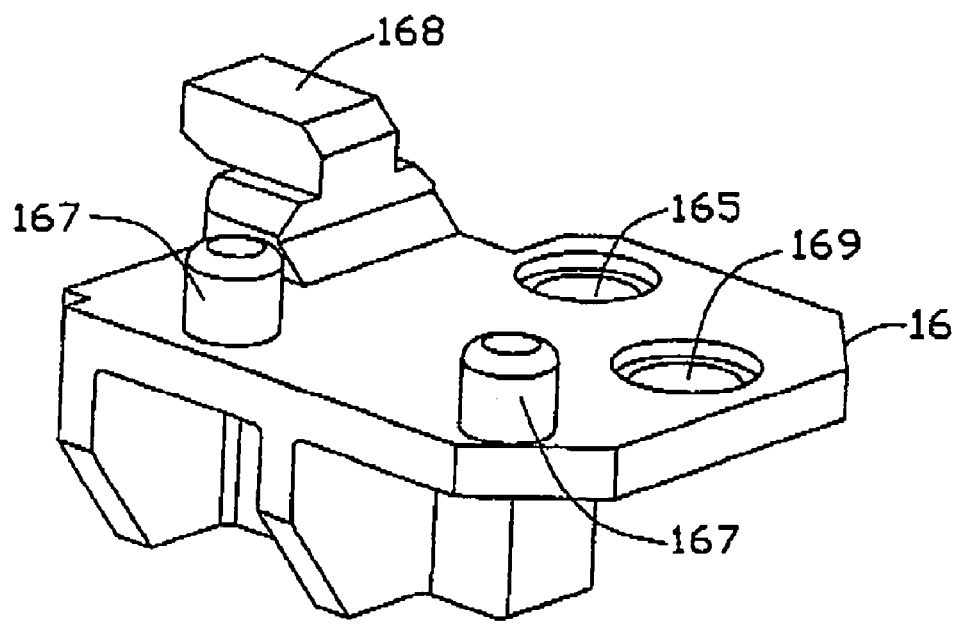
FIG. 5 is a perspective view of the second seat shown in FIG. 4, from a reverse aspect.

Also referring to FIG. 4, the second seats 16 have the same structure. Each second seat 16 has a groove 161 and a corresponding groove surface 164 configured for accommodating the beams 151, 152. A cylindrical-shaped recess 162 is defined at the bottom of the groove 161 and within the groove surface 164. The recess 162 is configured for accommodating the spring 182 of the adjustable device 18. A cylindrical-shaped pin 163 extends from the bottom of the recess 162 for positioning the spring 182. A screw hole 165 is defined at a side of a rear part of the groove 161 and the screw hole 165 engages with the adjustable screw 181. Since the adjustable screw 181 is located at a side of the groove 161, that is, it is located at a side of the beam, and the conical-shaped surface contacts with the beam, a force applied by the adjustable screw 181 against the beam can be divided into two portions: a vertical force portion and a horizontal force portion. The vertical force portion fixes the beam in the groove 161. The horizontal force portion presses the beam against a side wall 166 of the groove 161.

Two cylindrically-shaped position pins 167 and a latch 168 protrude from a lower side of the second seat 16. The position pins 167 and the latch 168 respectively engage with a position hole 111 and a latch hole 112 which are defined on the chassis 11. Each second seat 16 has a second screw hole 169. By screwing of the screw 164 into the second screw hole 169 and into a corresponding screw hole (not labeled) in the chassis 11, the second seat 16 is fixed on the chassis 11.

Compared with the convention reproducing/recording apparatus, the guide device 15 of the optical reproducing/recording apparatus 1 in accordance with the present invention is fixed on the second seats 16 by an adjustable device 18. The adjustable screw 181 of the adjustable device 18 fixes the beam 151, 152 in the groove 161 against a side wall 166 of the groove 161. Thus, the adjustable screw 181 forces the beams 151, 152 to press against the side walls 166 of the groove 161 to fix the horizontal position of the beams 151, 152 of the guide device 15. Thus the ends of the beams 151, 152 are fixed in a horizontal direction.

Although the present invention has been described with reference to a specific embodiment, it should be noted that the described embodiment is not necessarily exclusive and that various changes and modifications may be made to the described embodiment without departing from the scope of the invention as defined by the appended claims.

What is claimed is:

1. A reproducing/recording apparatus comprising:
 a chassis comprising a first seat and three second seats;
 a turntable located on the chassis, for rotating an optical disc located thereon;
 an optical pickup head; and
 a guide device on which the optical pickup head moves comprising a first and second beams, an end of the first beam being fixed on the first seat, the other end of the first beam and two ends of the second beam respectively being fixed on the second seats by an adjustable device;
 wherein at least a second seat has a groove and a corresponding groove surface configured for accommodating the beam, the corresponding adjustable device comprises an elastic element and an adjustable element, the elastic element is positioned between the beam and the groove surface, the groove surface comprises a recess at the bottom of the groove for accommodating the elastic element, and the adjustable element engages at a side of said groove and fixes the beam in the groove.

2. The reproducing/recording apparatus in accordance with claim 1, wherein a first pin perpendicularly extends from a bottom of the recess.

3. The reproducing/recording apparatus in accordance with claim 2, wherein a latch and two position pins extend from a lower surface of the second seat, the latch and the position pins extend oppositely to the first pin extending from the bottom of the recess.

4. The reproducing/recording apparatus in accordance with claim 3, wherein the chassis comprises at least three latch holes for engaging with the latch of the second seat, and at least three position holes for accommodating the position pins of the second seat.

5. The reproducing/recording apparatus in accordance with claim 4, wherein the elastic element is a spring and the adjustable element is a screw.

6. The reproducing/recording apparatus in accordance with claim 5, wherein the second seats have the same structure.

7. The reproducing/recording apparatus in accordance with claim 6, wherein the optical pickup head comprises a contact and two lantern rings, and the contact engages with the second beam and the lantern rings engages with the first beam.

8. The reproducing/recording apparatus in accordance with claim 7, wherein the first seat comprises a groove for accommodating the end of the first beam, and a screw hole is defined at an end of the groove.

9. The reproducing/recording apparatus in accordance with claim 8, wherein the first seat further comprises a screw for engaging with the screw hole of the first seat, and a gasket is engaged between the screw and the first beam.

10. An optical reproducing/recording apparatus comprising:
 a chassis comprising a first seat and three second seats;
 a turntable located on the chassis, for rotating an optical disc located thereon;
 an optical pickup head; and
 a guide device on which the optical pickup head moves, the guide device comprising a first and second beams, an end of the first beam being fixed on the first seat, the other end of the first beam and two ends of the second beam respectively being fixed on the second seats by an adjustable device;
 wherein the second seats have the same structure, each second seat has a groove and a corresponding groove surface configured for accommodating the beam, the groove surface of the groove has a recess defined at a bottom thereof, each adjustable device comprises an elastic element and an adjustable element, the elastic element is accommodated in the recess, and the adjustable element engages at a side of said groove and fixes the beam in the groove.

11. The reproducing/recording apparatus in accordance with claim 10, wherein a first pin perpendicularly extends from a bottom of the recess.

12. The optical reproducing/recording apparatus in accordance with claim 11, wherein a latch and two position pins extend from a lower surface of the second seat, and said latch and position pins extend oppositely to the first pin extending from the bottom of the recess.

13. The optical reproducing/recording apparatus in accordance with claim 12, wherein the chassis comprises at least three latch holes for respectively engaging with the latch of the second seats and at least three position holes for respectively accommodating the position pins of the second seats.

14. The optical reproducing/recording apparatus in accordance with claim 13, wherein the elastic element is a spring and the adjustable element is a screw.

15. The optical reproducing/recording apparatus in accordance with claim 14, wherein the optical pickup head comprises a contact and two lantern rings, and the contact engages with the second beam and the lantern rings engage with the first beam.

16. The optical reproducing/recording apparatus in accordance with claim 15, wherein the first seat comprises a groove for accommodating the end of the first beam, and a screw hole is defined at an end of the groove.

17. The reproducing/recording apparatus in accordance with claim 16, wherein the first seat further comprises a screw for engaging with the screw hole of the first seat, and a gasket is engaging between the screw and the first beam.

18. An optical reproducing/recording apparatus comprising:
   a chassis comprising a first seat and three second seats;
   a turntable located on the chassis, for rotating an optical disc located thereon;
   an optical pickup head; and
   a guide device on which the optical pickup head moves comprising a first and second beams, an end of the first beam being fixed on the first seat, the other end of the first beam and two ends of the second beam respectively being fixed on the second seats by an adjustable device;
   wherein the second seats have the same structure, each second seat defines a groove configured for accommodating the beam, each adjustable device comprises an elastic element and an adjustable element, the adjustable element fixes the beam in the groove, each second seat has a recess and a recess surface therein, the recess and the recess surface are depressed into a respective second seat from a bottom of the corresponding groove, the recess surface urges the elastic element against the beam, and a position pin extends from the recess surface to position the elastic element therearound.

* * * * *